United States Patent
Gvily (10) Patent No.: US 7,739,354 B2
(45) Date of Patent: *Jun. 15, 2010

(54) ADDING DATA TO TEXT PAGES BY MEANS OF AN INTERMEDIARY PROXY

(75) Inventor: Yaniv Gvily, Morgan Hill, CA (US)

(73) Assignee: SAP Portals Israel Ltd., Ra'anana (IL)

(*) Notice: Subject to any disclaimer, the term of this patent is extended or adjusted under 35 U.S.C. 154(b) by 1864 days.

This patent is subject to a terminal disclaimer.

(21) Appl. No.: 09/797,318

(22) Filed: Mar. 1, 2001

(65) Prior Publication Data

US 2002/0078201 A1    Jun. 20, 2002

Related U.S. Application Data

(60) Provisional application No. 60/240,032, filed on Oct. 12, 2000.

(51) Int. Cl.
*G06F 15/16* (2006.01)
*G06F 3/00* (2006.01)

(52) U.S. Cl. .................. 709/218; 709/203; 709/217; 709/219; 715/738; 715/739

(58) Field of Classification Search .............. 709/203, 709/217–219; 715/501.1, 513, 530, 531, 715/539, 738, 739
See application file for complete search history.

(56) References Cited

U.S. PATENT DOCUMENTS

| | | | | |
|---|---|---|---|---|
| 5,752,022 A | * | 5/1998 | Chiu et al. ............... 707/10 |
| 5,961,601 A | * | 10/1999 | Iyengar .................. 709/229 |
| 6,044,385 A | * | 3/2000 | Gross et al. ............. 715/526 |
| 6,094,677 A | | 7/2000 | Capek et al. |
| 6,112,228 A | | 8/2000 | Earl et al. |
| 6,226,642 B1 | * | 5/2001 | Beranek et al. ............ 707/10 |
| 6,295,542 B1 | * | 9/2001 | Corbin ................. 715/501.1 |
| 6,338,059 B1 | * | 1/2002 | Fields et al. ............... 707/4 |
| 6,392,668 B1 | * | 5/2002 | Murray .................. 345/738 |
| 6,415,307 B2 | * | 7/2002 | Jones et al. ............. 715/525 |
| 6,441,834 B1 | * | 8/2002 | Agassi et al. ........... 345/764 |
| 6,463,440 B1 | * | 10/2002 | Hind et al. ............. 707/102 |
| 6,470,306 B1 | * | 10/2002 | Pringle et al. ............. 704/3 |
| 6,581,065 B1 | * | 6/2003 | Rodkin et al. .......... 707/102 |
| 6,763,343 B1 | * | 7/2004 | Brooke et al. ............. 707/1 |
| 6,938,170 B1 | * | 8/2005 | Kraft et al. .............. 726/23 |
| 6,993,591 B1 | * | 1/2006 | Klemm ................. 709/232 |
| 2002/0065955 A1 | * | 5/2002 | Gvily ................... 709/330 |
| 2002/0147637 A1 | * | 10/2002 | Kraft et al. .............. 705/14 |

* cited by examiner

*Primary Examiner*—William C Vaughn, Jr.
*Assistant Examiner*—Umar Cheema
(74) *Attorney, Agent, or Firm*—Buckley, Maschoff & Talwalkar LLC (57) ABSTRACT

The invention relates to providing embedded data into a text page by means of a proxy. The proxy analyzes the unstructured data of a text page, understands the meaning behind the data, associates data with some of the unstructured data and stores this meta-data back into the original text page. The invention stores data in a location that is hidden from the user's view so that it is unobtrusive but easily retrievable.

54 Claims, 13 Drawing Sheets

ADDING DATA TO TEXT PAGES BY MEANS OF AN INTERMEDIARY PROXY

BACKGROUND OF THE INVENTION

This application claims priority to U.S. Provisional Patent Application No. 60/240,032 filed Oct. 12, 2000 entitled, ADDING META-DATA TO EXISTING WEB PAGES BY MEANS OF A PROXY SERVER.

In addition, this application is related to co-pending U.S. Application No. 09/797,491, filed Mar. 1, 2001, entitled, CLIENT-BASED OBJECTIFYING OF TEXT PAGES commonly assigned and hereby incorporated by reference for all purposes.

The World Wide Web is an integrated network of sites, each website is specialized in a different subject or theme. Despite the differences, most sites can be categorized into groups based upon their content. Some sites specialize in news, some in sports, others in book e-tailing and still others in investment.

Hypertext pages viewed over the World Wide Web are free-form text documents. They are not self-descriptive in the way that they do not contain the meaning of the displayed text. It is up to the reader of the site to interpret the text into meaningful information. This all works well for a human reader. However, a machine reading this text (data) is lacking the necessary descriptors to understand what is being displayed.

Therefore, it would be advantageous to provide a method of analyzing the unstructured data of text pages, understanding the data behind it and storing this data back into the original text page by means of a proxy. The data may be stored, hidden from the user's view, so that it is unobtrusive. However, applications that know where to look for this data can easily access and utilize it.

SUMMARY OF THE INVENTION

The invention relates generally to embedding data into text documents by means of a proxy. The proxy acts as an intermediary between a resource and a request for the resource. In one embodiment, a computer implemented method for embedding data in a text page at a proxy is disclosed. The proxy receives a request for the resource. The proxy then extracts a resource identifier from the request and stores the resource identifier. The proxy forwards the request for the resource from the proxy to a location having the resource. The proxy receives the resource and thereafter parses the resource based on the identifier so as to search the resource and identify one or more recognized elements in the resource. Finally, the proxy embeds data into the resource based on the one or more recognized elements.

In another embodiment, a computer implemented method for adding data to an HTML document using a proxy is disclosed. In the disclosed method, a request is generated by a web browser located on a client machine. The request is submitted and intercepted at a proxy. The proxy extracts a URL that identifies, from the request, the requested source whether it is outside or inside the intranet, and thereafter stores the URL in computer readable memory. The proxy then forwards the request to the web server associated with the stored URL.

The requested web server interprets the request, locates the appropriate resource, and thereafter returns content to the proxy using a response. Based in part upon the stored URL, the proxy locates a template that is associated with the resource associated with the response. Once a corresponding template is found, the proxy parses the response and builds a document object model (DOM). The DOM is analyzed using the template. The proxy then embeds meta-data into the HTTP response in the form of new DOM nodes thereby building a new DOM document. The proxy serializes the new DOM back into HTML and returns the new HTML stream, now with the embedded data, to the web browser located on the client machine.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

The invention described hereinafter discloses a computer implemented method for embedding data in a text page at a proxy, where the proxy is generally an intermediary between a resource and a request for a resource. More particularly, the invention provides exemplary systems and methods for embedding either meta-data or scripts into HTML pages by means of a proxy. The intermediary proxy analyzes the unstructured data of a hypertext page, understands the meaning behind the data, associates meta-data with some of the unstructured data and stores this meta-data back into the original hypertext page. The invention potentially stores meta-data in a location that is hidden from the user's view so that it is unobtrusive but easily retrievable.

As used herein, the term proxy may refer to any apparatus residing at the gateway between an HTTP request and response. Since all HTTP traffic flows through this point, the proxy is able to capture and modify HTTP requests. Embodiments of a proxy in accordance with the present invention include, but are in no way limited to, a proxy server or an extension to one, a firewall or an extension to one, the local application on each machine responsible for network connections (in the case where the intranet is a single machine, this application is the bottleneck through which all communications pass), a modem or its driver or an Internet Service Provider (ISP).

Previous methods required the installation of an ActiveX control or other native code on each client machine that extended existing links. In contrast, the invention of the present invention requires zero installation on user machines 101, since the steps for extending existing links of a web site occur at a proxy.

Figure 1:
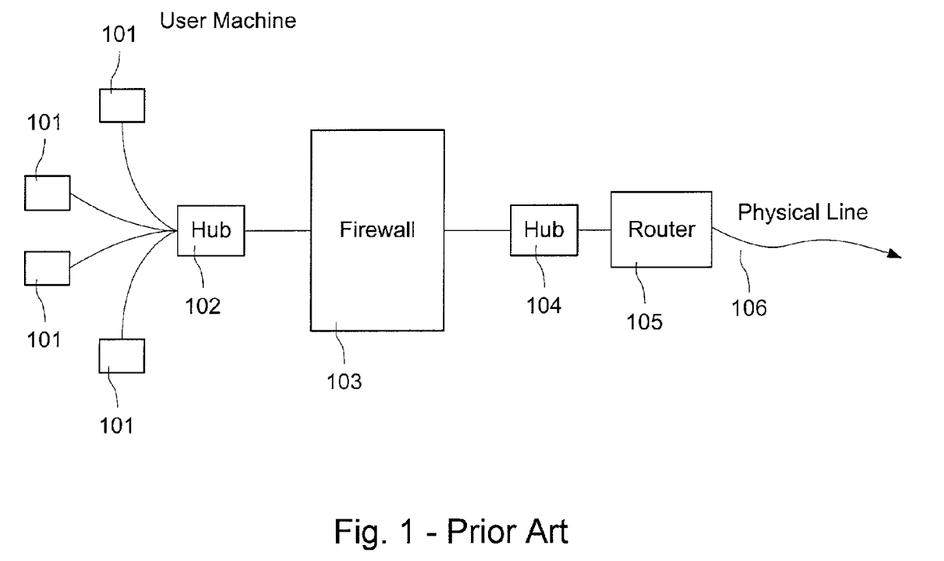
FIG. 1 is a prior art corporate network.

There are numerous configurations for implementing the present invention. In the illustrated embodiment of FIG. 1, the invention is implemented and described using a typical corporate network. User machines 101 connect internally to firewall 103 through hub 102. For security reasons, this network configuration of FIG. 1 is preferred to simply allowing users 101 to connect directly to the Internet. Firewall 103 is then coupled to router 104 through a second hub 104. Router 105 is ultimately coupled to the Internet through physical line 106.

As will be described hereinafter, the corporate network provides a single point of connection between the corporate intranet and the Internet. In one embodiment, this single point, or bottleneck, is a server machine running a firewall coupled to a physical line leading to the Internet Service Provider (ISP) on one end and coupled to the physical intranet wire on the other end. Since all Internet traffic passes through this point, the bottleneck provides a preferred location to situate a proxy embodying the present invention.

Embedding Data at a Proxy

Figure 2:
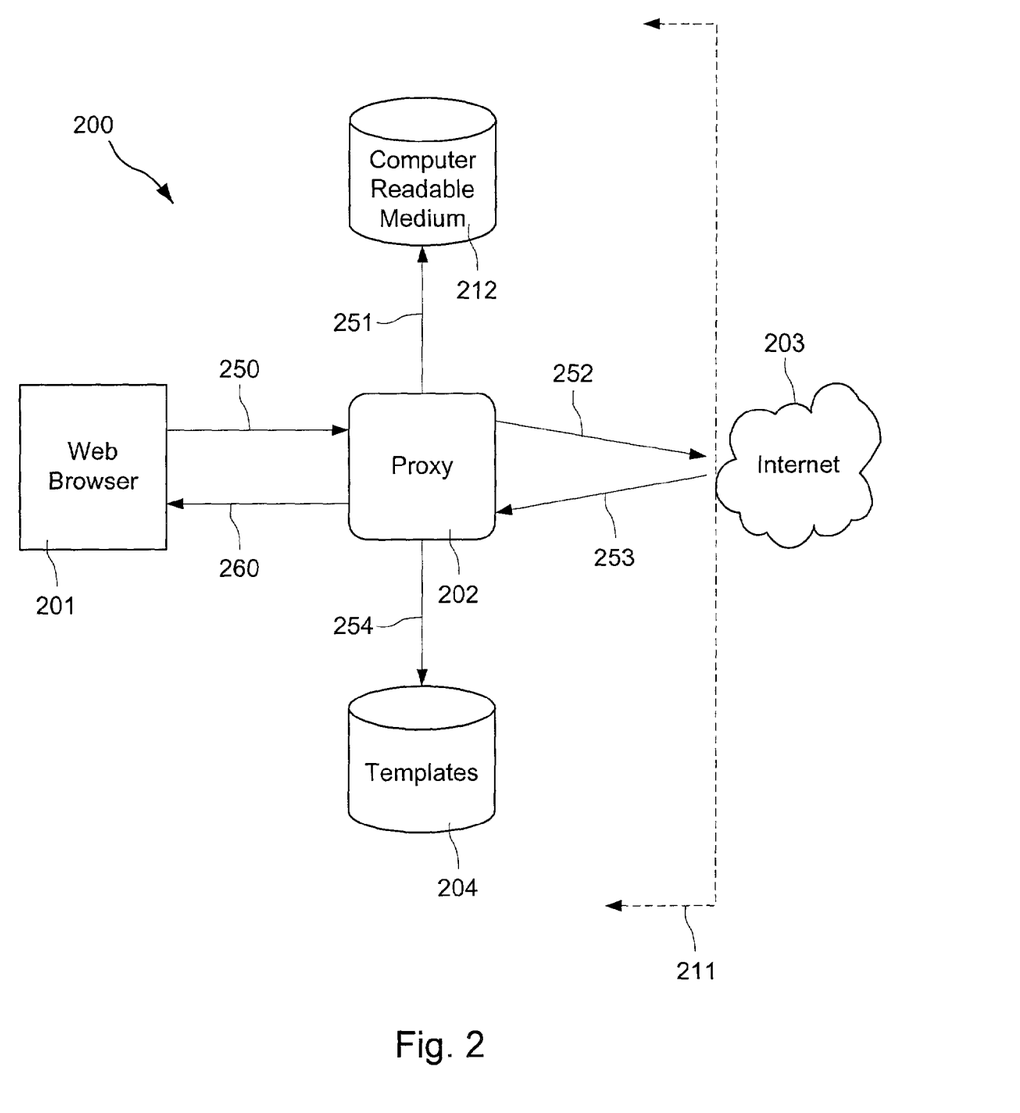
FIG. 2 is one embodiment of a network embodying the present invention.
Figure 2A:
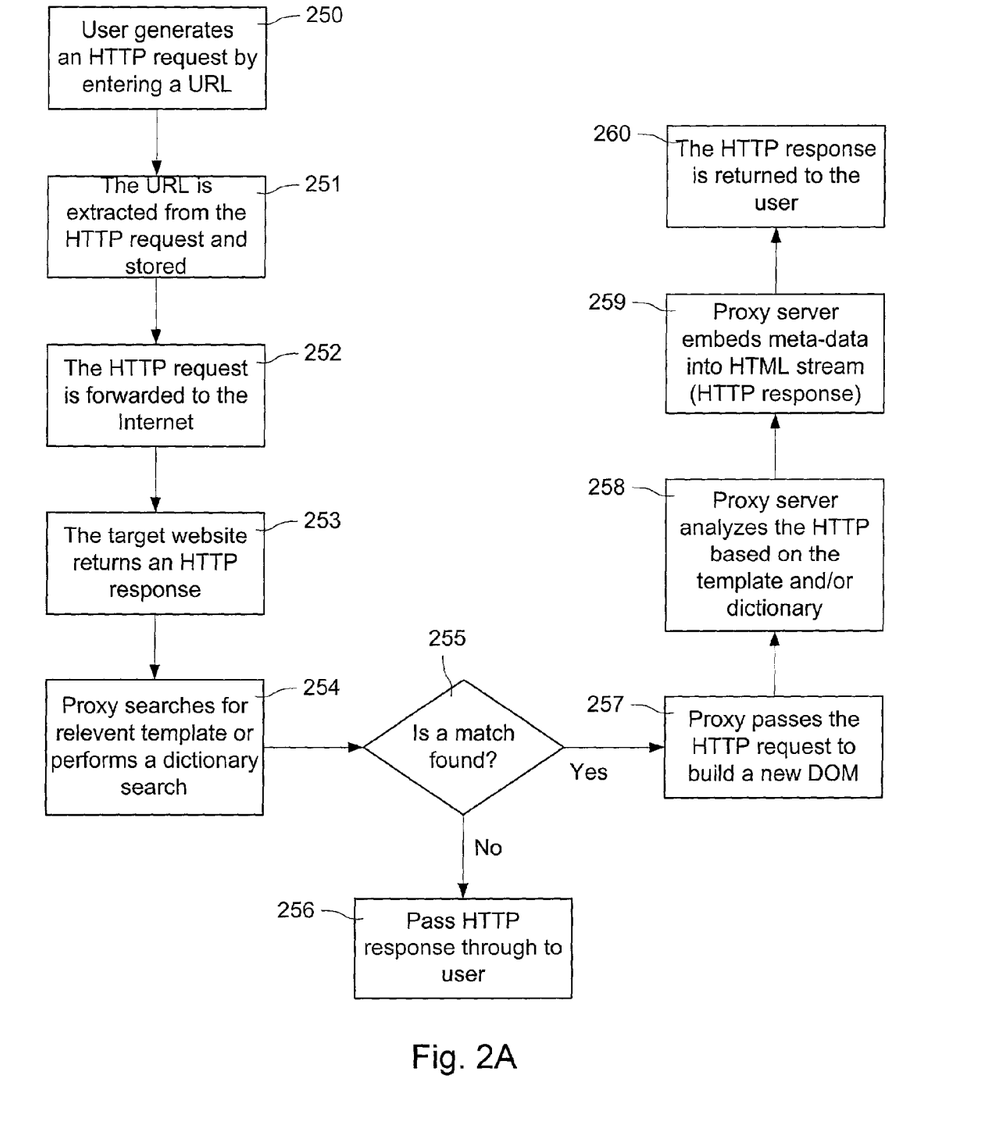
FIG. 2A is a flow chart of the steps for the embodiment of FIG. 2.

Referring now to FIGS. 2 and 2A, one embodiment of the present invention will now be described in detail using an example of a typical network set-up. A user generates an HTTP request (step 250) by entering a URL into a web browser 201. If the HTTP request is for a resource outside of intranet 211, the request is sent outside of intranet 211 to Internet 203. In most corporate intranet setups, there is a single point of connection bridging the gap between intranet 211 and Internet 203. In one embodiment of the invention, the connection, or bottleneck, is a server machine running a firewall 103 coupled to a physical line 106 that is in turn coupled to the Internet Service Provider (ISP) and coupled on the other end to a physical intranet wire. In another embodiment of the invention, the single point of connection is a proxy 202.

The HTTP request is intercepted at the single connection point. The URL entered in step 250 is extracted from the request and stored for future use (step 251). The HTTP request is forwarded (step 252) from proxy 202 to Internet 203 for locating the requested resource. The target website, or requested resource, returns an HTTP response (step 253) to proxy 202.

In response to the receipt of an HTTP response, proxy 202 queries its database of templates and/or dictionary 204, to identify and relevant template and/or dictionary for the target resource, i.e. the URL stored in step 251 (step 254). If a match is found, proxy 202 parses the HTTP response to build a Document Object Model (DOM) document (step 257). DOM is a platform and language neutral interface that allows programs and scripts to dynamically access and update the content and structure of HTML documents. As such, all document content, including all elements and their attributes, can be added, removed or changed.

Proxy 202 then analyzes the DOM document based on any retrieved template(s) (step 258), and thereafter embeds meta-data into the DOM document in the form of new DOM nodes (step 259). The DOM is then serialized again as plain HTML text, put into the HTTP response and transmitted to the user machine (step 260). The user machine is unaware that the HTML content has been modified. In one embodiment, proxy 202 may ignore requests that it need not extend, such as requests for images or any non-HTML responses, so as to prevent the proxy from having a performance hit in such cases.

The process of analyzing the existing DOM of an HTML page is now described. In one aspect of the invention, the textual content of the HTML page is scanned for known words or phrases. This scanning phase may be referred to as the dictionary analysis. For example, the word "United States" is identified as a location and a country. Once identified, proxy 202 subsequently inserts this meta-data into the HTML stream. Different dictionaries may be used for different sites. For example, one dictionary may always be used for sports sites, while another may be used for a news sites. In another aspect of the invention, the known structure of existing hyperlinks and other elements are analyzed and extended. For example, http://www.mybookstore.com/book?isbn=1234567890 points to a book whose ISBN is 1234567890. Accordingly, links are analyzed differently for each domain. In yet another aspect of the invention, data is recognized by its location on the page. For example, a particular web page may always use big text at the top of a page to identify a book title. A template of the present invention may then be used to scan this particular web page and extract the title of the book. Accordingly, there are different templates that recognize text by location for each recognized domain.

Figure 3:
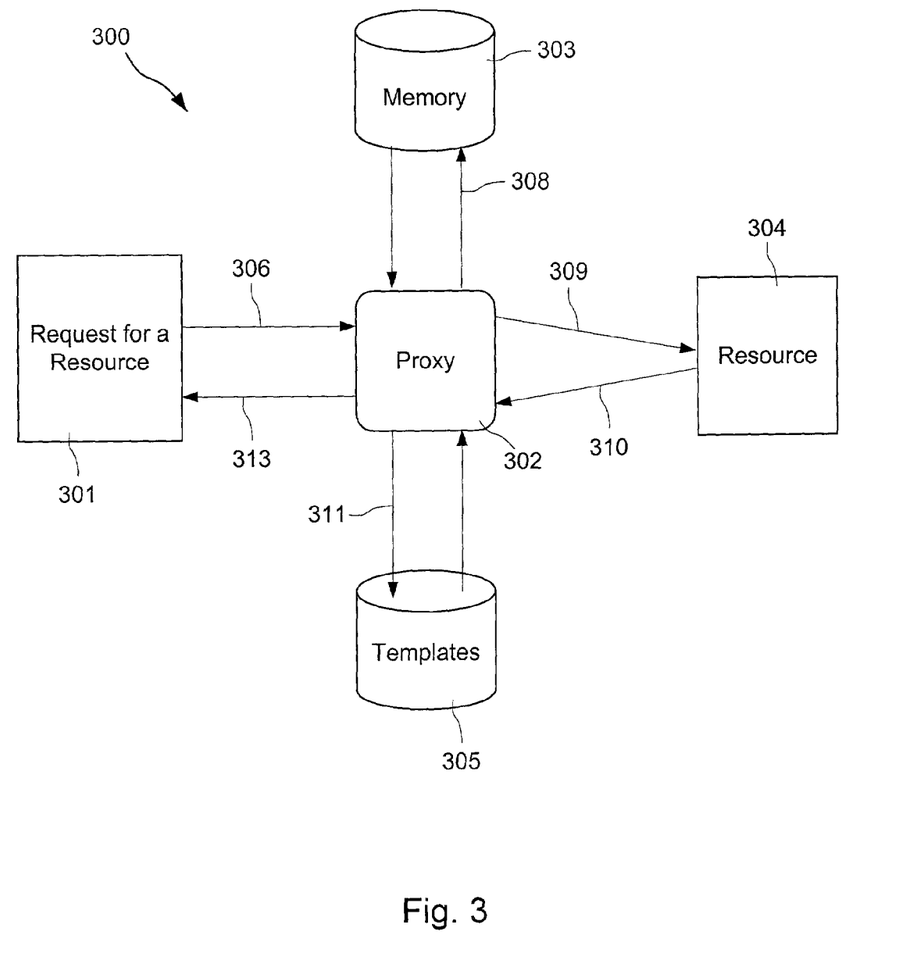
FIG. 3 is a second embodiment of a network embodying the present invention.
Figure 3A:
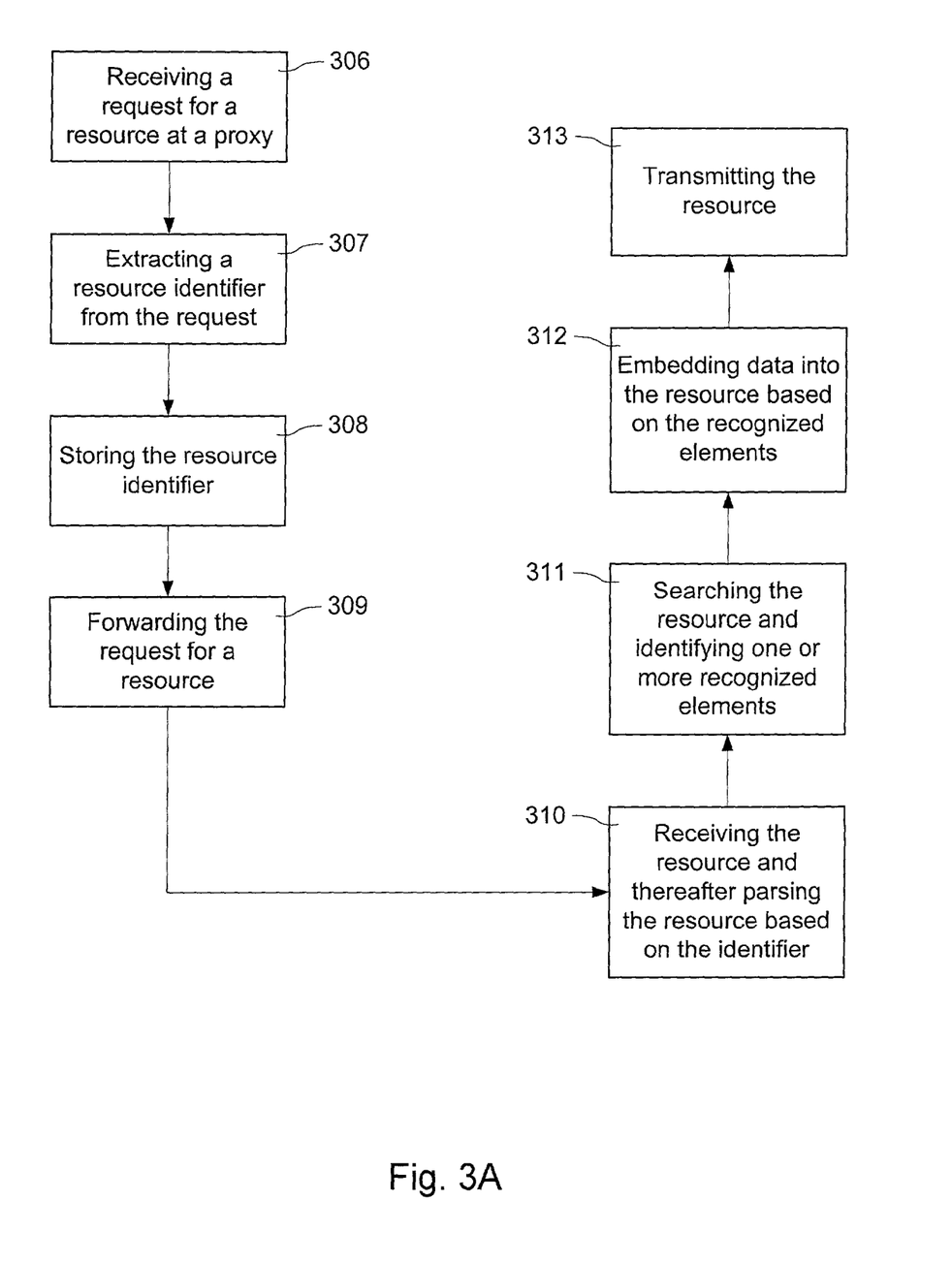
FIG. 3A is a flow chart of the steps for the embodiment of FIG. 3.

Referring now to FIGS. 3 and 3A, a second embodiment of the present invention is illustrated and described. To begin, a user generates a request for a resource 301 at a location 306. The request may be an HTTP request for an HTML document or a request for a document generated from a document management database or a software package such as a word processing, spreadsheet or database software package to name a few. The request is transmitted from the user to proxy 302. Proxy 302 receives the request for a resource (step 306) and thereafter extracts an identifier that serves to identify the request (step 307). The resource identifier may be a URL or any other way of identifying the makeup of the request. The identifier may then be stored in computer readable memory 303 coupled to proxy 302 for later retrieval (step 308).

Proxy 302 then transmits the request for resource to a location having the resource (step 309). The resource location may reside within a secondary subnet for the organization or it may be located on the Internet. The resource is then returned in the form of a response, and thereafter intercepted by proxy 302.

Continuing, proxy 302 receives the response and parses the resource based on the identifier (step 310). By parsing the resource, the proxy is able to search and identify one or more recognized elements in the resource (step 311). The search and identify step performed at proxy 302 may entail a dictionary search of the resource. A dictionary search involves locating recognized words or phrases in the resource. The identifier may be used to facilitate this process. In addition, the recognized words or phrases may be located in a database or other storage medium 305 coupled to proxy 302.

The search and identify step may also entail a pattern search of the resource. A pattern search involves locating known patterns in a resource. The known patterns may be stored in a database or other storage medium coupled to proxy 302. In addition, the patterns proxy 302 is trying to locate may be a link or a graphic. The search and identify step may also be a search for recognized elements based on their respective location within the resource. For example, text may be always found in a particular location, in which case proxy 302 would be able to always find it based at least in part on the unique identifier.

Once an element is recognized, proxy 302 then embeds data into the resource (step 312). Embedded data may be a link, meta-data or a script relating to the recognized elements.

Prior to or after the embedding step, the recognized elements may be stored in a log file in the form of detected element data. Once the data is embedded into the resource, the resource is returned to the location from which the request for a resource originated (step 313).

Embedding Data Examples

Figure 4:
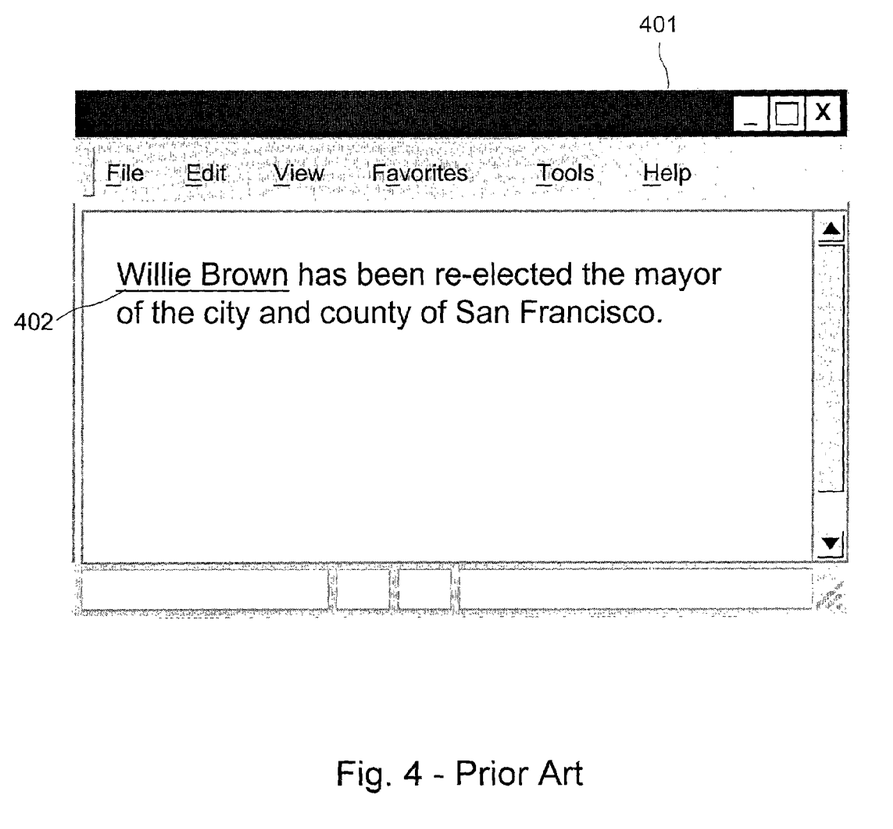
FIG. 4 is a prior art hypertext page.
Figure 5:
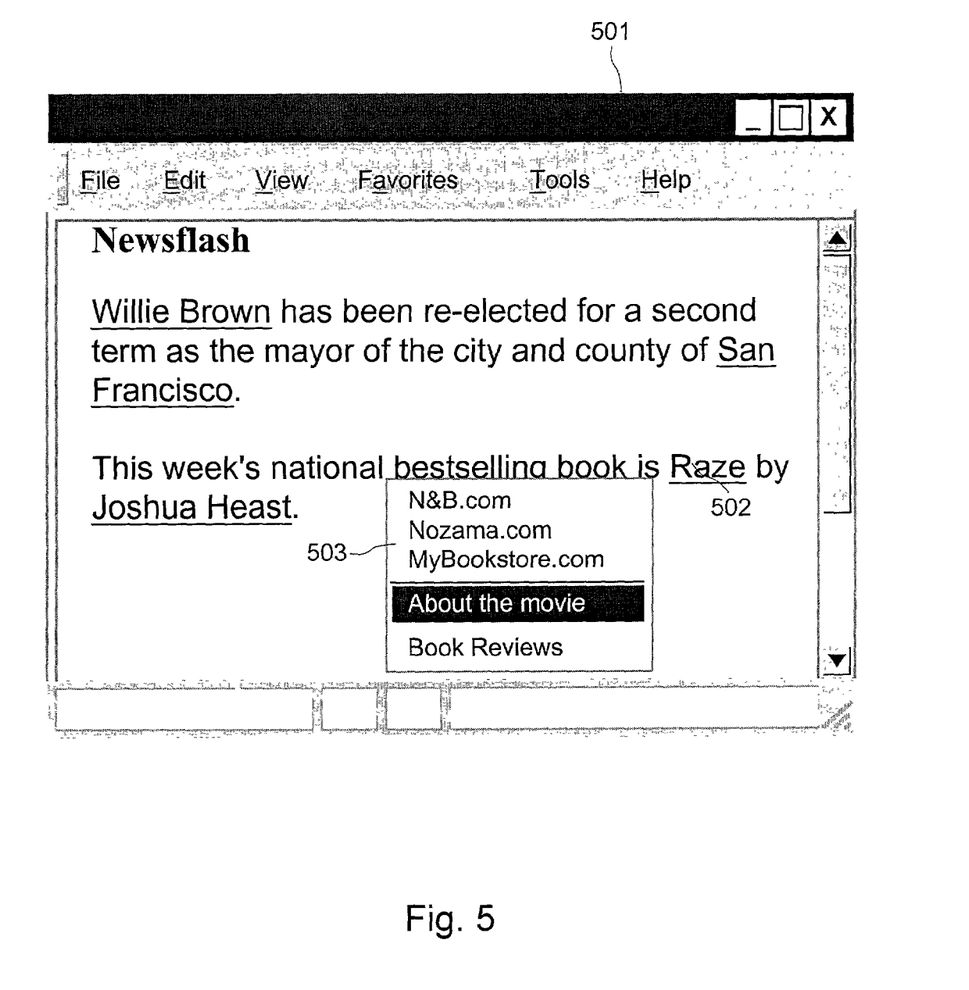
FIG. 5 is a hypertext page having a content menu using the embedded meta-data of the present invention.

FIG. 4 shows an example of a prior art hypertext page 401 consisting of some text and a hyperlink 402. The following illustrates source code that may be used to render that page:

```
<HTML>
<HEAD>
</HEAD>
<BODY>
    <A HREF="http://xyz.somewhere.com">Willie Brown</A> has been re-elected as the mayor
of the city and county of San Francisco.
</BODY>
</HTML>
```

For purposes of the example, assume that the analysis process for the HTML page has recognized two objects on the page: Willie Brown and San Francisco. Willie Brown is recognized as a name, Willie as a first name and Brown as a last name. Continuing, San Francisco is recognized as a location. The meta-data of these objects will be embedded into the web page, effectively altering the source code to something like:

```
<HTML>
<HEAD>
</HEAD>
<BODY>
<A HREF="http://xyz.somewhere.com" META="<PERSON><FIRST>Willie</FIRST>
<LAST>Brown</LAST></PERSON>">Willie Brown</A> has been re-elected as the mayor
of the city and county of <SPAN META="<LOCATION><CITY>San
Francisco</CITY><STATE>CA</STATE></LOCATION>">San Francisco</SPAN>.
</BODY>
</HTML>
```

The example above shows one case where an attribute has been added to an existing tag, i.e. the META attribute of the A tag. In addition, the example illustrates an attribute in which a new tag has been added where there had been none before, i.e. the SPAN tag. Neither change alters the rendering of the web page. The web browser ignores the additional tags when drawing the page. The user is unaware of the changes to the page. Also, note that since the meta-data is stored in XML format, it is quite easily extensible. As such, it may therefore be desirable to include the country as well as the city and state in the location object in the above example.

A designer of the analysis tool may program one aspect of the invention so as to cause changes in the rendering of the HTML page. For example, an analyzer may automatically add HRNP links where there were none, and alter existing hyperlinks to HRNP links where applicable. HRNP links are described in U.S. Pat. No. 5,848,424 which is hereby incorporated by reference in its entirety for all purposes. In summary, HRNP links provide a method for meta-data based hyperlink navigation. One possible implementation may produce the following code:

```
<HEAD>
</HEAD>
<BODY>
<A HREF="hrnp://xyz.myserver.com/person/Willie,+Brown">Willie Brown</A> has been
re-elected as the mayor of the city and county of <AHREF="hrnp://xyz.myserver.com/city/SF,
+CA">San Francisco</A>.
</BODY>
</HTML>
```

Since HRNP links have a rigid structure one must follow, the meta-data is not stored in XML style but rather as part of the HRNP HREF string.

Network Configurations

Figure 6:
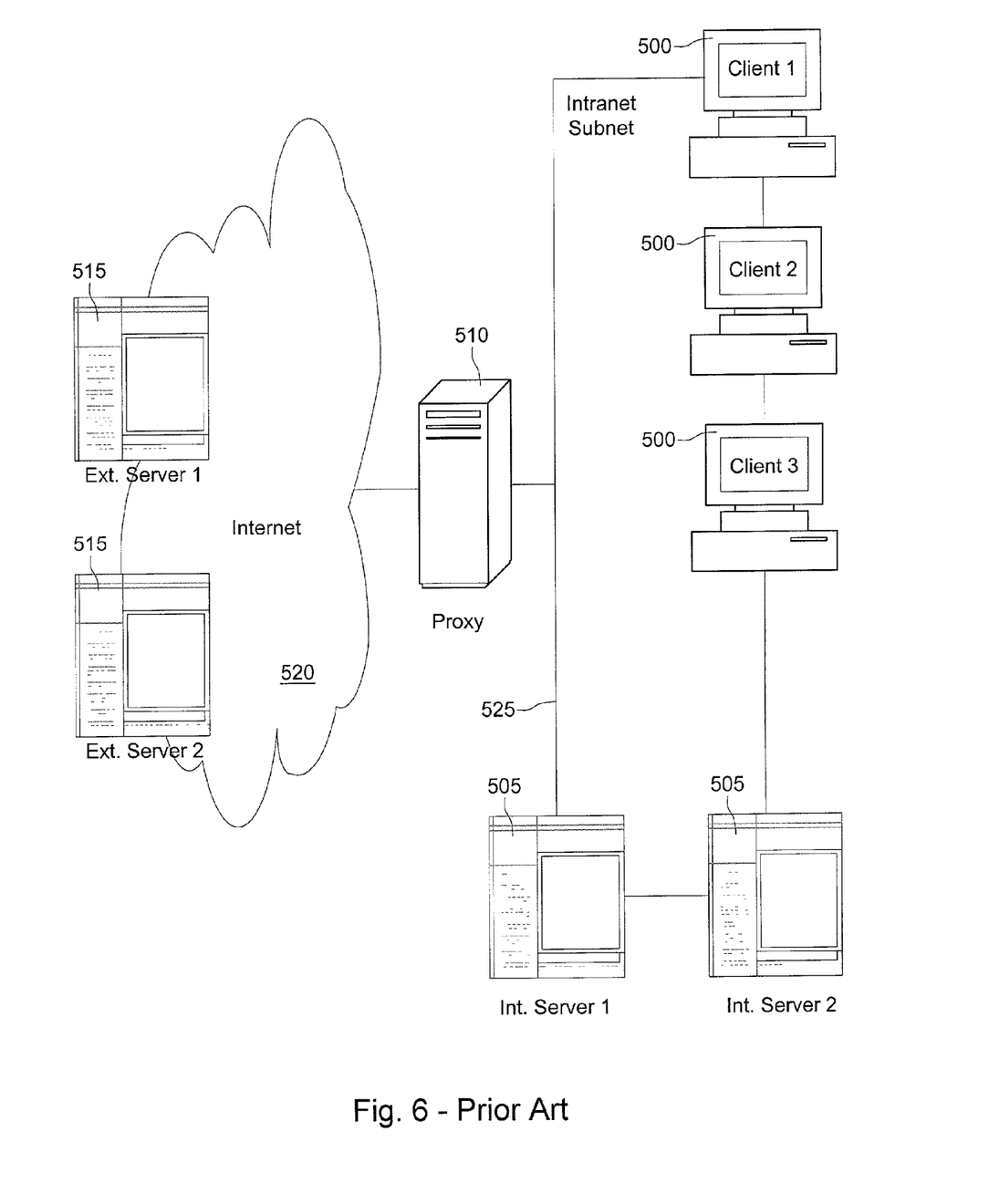
FIG. 6 is a prior art network configuration.

FIG. 6 shows a prior art network that does not have the present invention implemented thereon. Client computers 500 are arranged in intranet subnet 525 along with internal servers 505. The intranet subnet is coupled to Internet 520 through a gateway or bottleneck 510. In the illustrated example, gateway 510 is a proxy. Internet 520 has external servers 515, which is where content resides.

Figure 7:
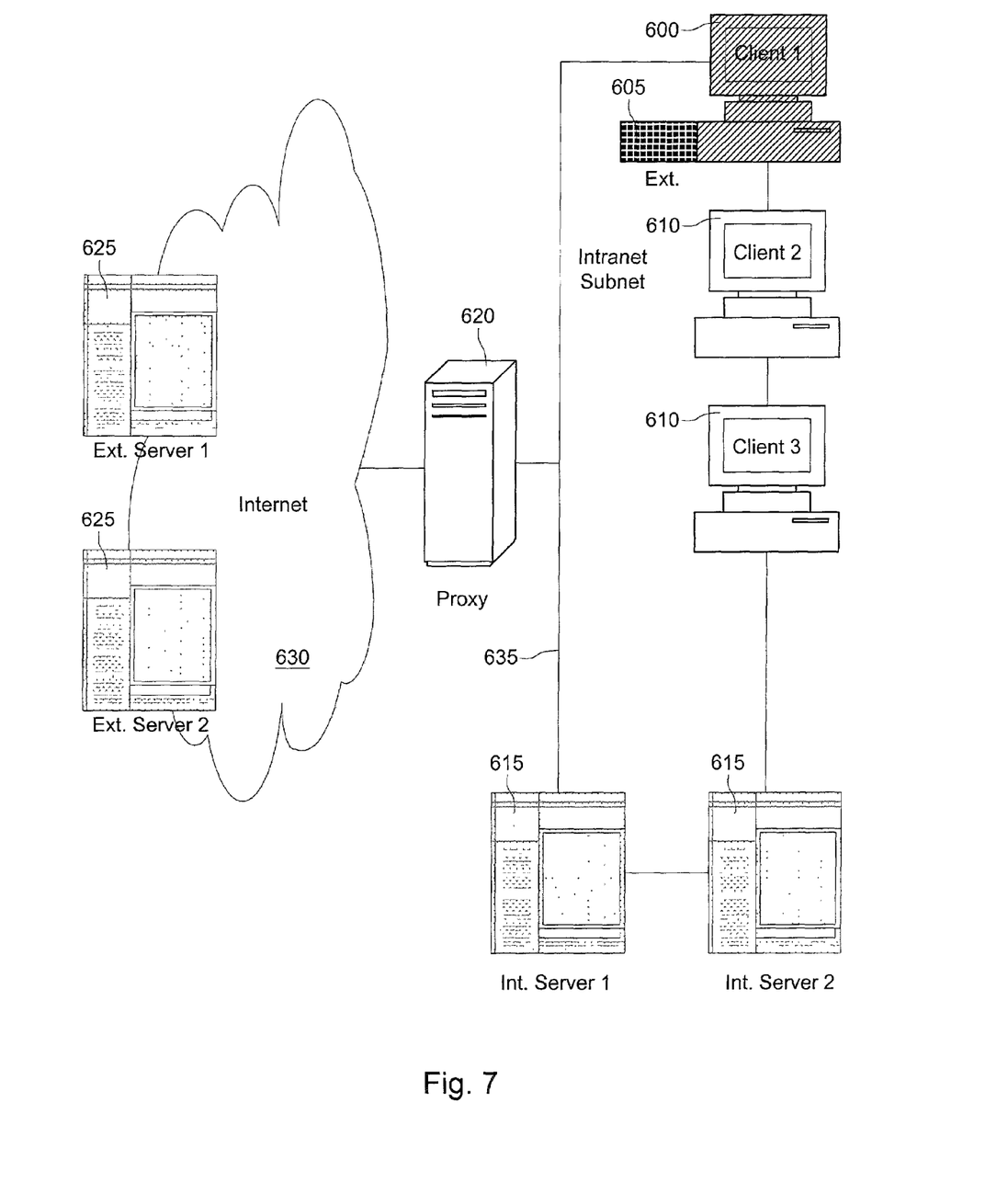
FIGS. 7-11 illustrate various network configurations for implementing the present invention.

FIG. 7 illustrates extension of the network shown in FIG. 6. The illustrated example in FIG. 7 extends the client to have access to extended web content. Client machine 600 has an extension 605 installed thereon which allows content coming from both internal servers 615 and external servers 625 to be extended. Although the network illustrated in FIG. 7 does not require modification of the configuration to embed data into a text page, it does require an installation on each client to do so. As stated previously, this type of client extension may be disfavored by some IS managers if their company policy forbids users from installing software on their machines.

Figure 8:
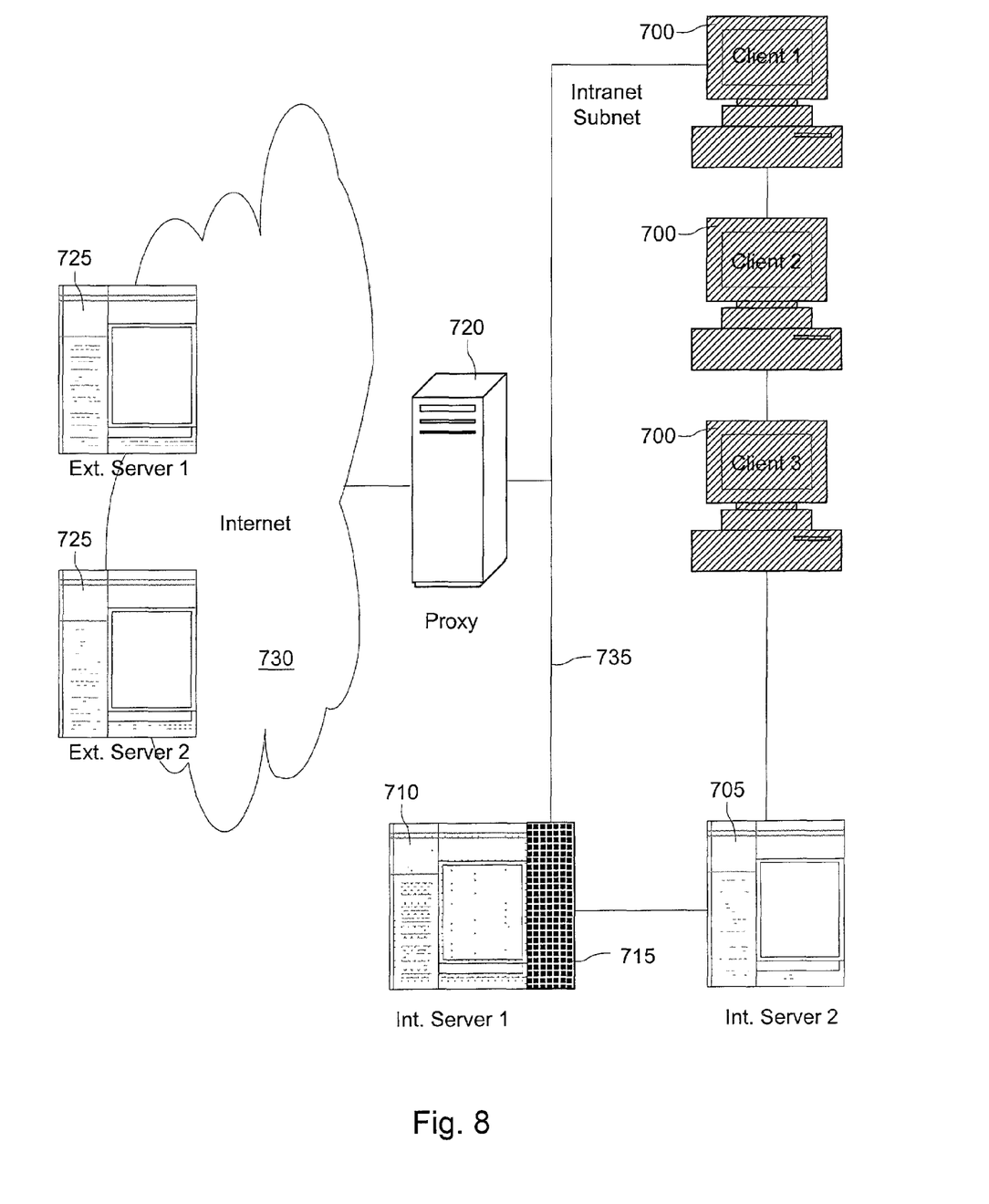

FIG. 8 illustrates the extension of the network using a server extension 715 to server 710. In the illustrated example, internal server 710 on intranet subnet 735 is extended using a filter, module or the like to allow the server to provide extended web content to client machines 700. In this example, there is no installation on client machines 700 and only a minimal change to the network configuration. Further, only content provider or server 710 is affected as far as performance is concerned. Without a similar server extension, however, the content provided by server 705 may not be extended.

Figure 9:
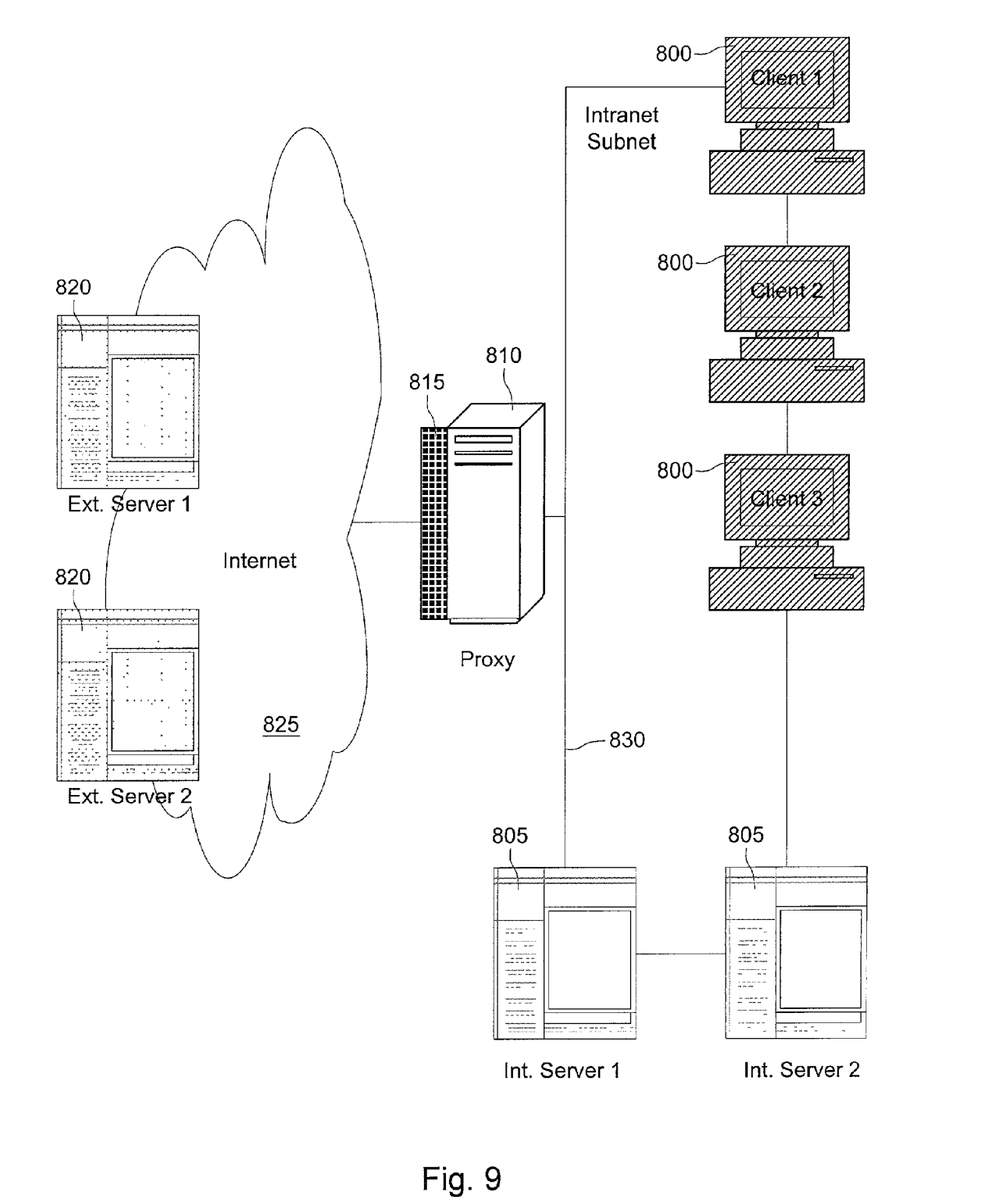

FIG. 9 illustrates an example of providing an extension 815 on a proxy 810, which is the intermediary between a resource and a request for a resource. In the illustrated example, this intermediary is the gateway between an intranet subnet 830 and the Internet 825. Continuing with FIG. 9, extension 815 allows the content provided to client machines 800 from external servers 820 to be enhanced, such as by embedding data into a text stream or embedding meta-data into an HTML stream. The extension of proxy 810 allows the extension of all content provided through it to be extended without installation of any program or software on the client machines 800.

Figure 10:
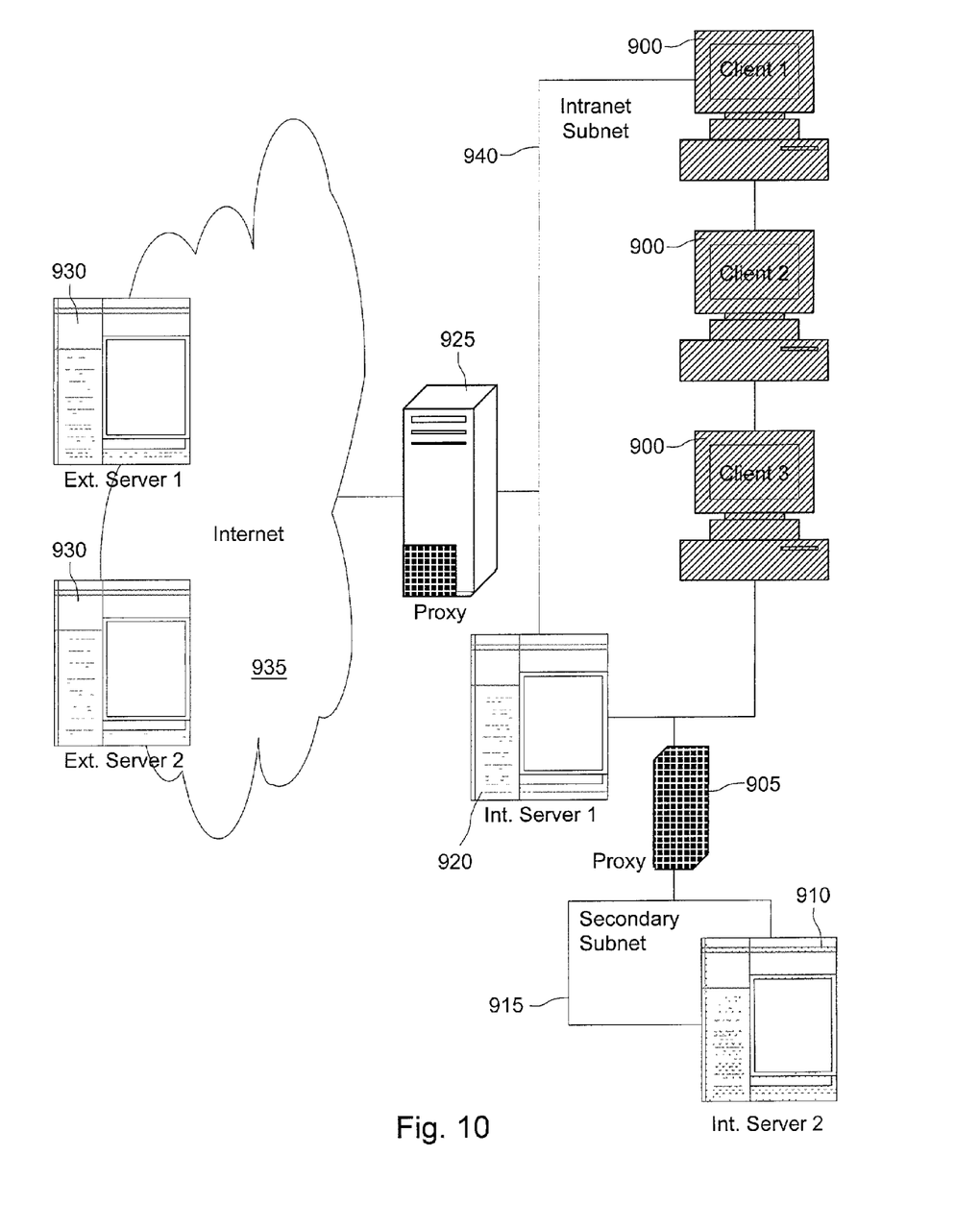

Continuing with the network example figures, FIG. 10 illustrates an example of providing an extension to a proxy 905 that is situated between an intranet subnet 940 and a secondary subnet 915. In this way, content provided from internal server 910 situated within the secondary subnet can be extended to client machines 900 situated on the primary intranet subnet without the installation of any software on the machines.

Figure 11:
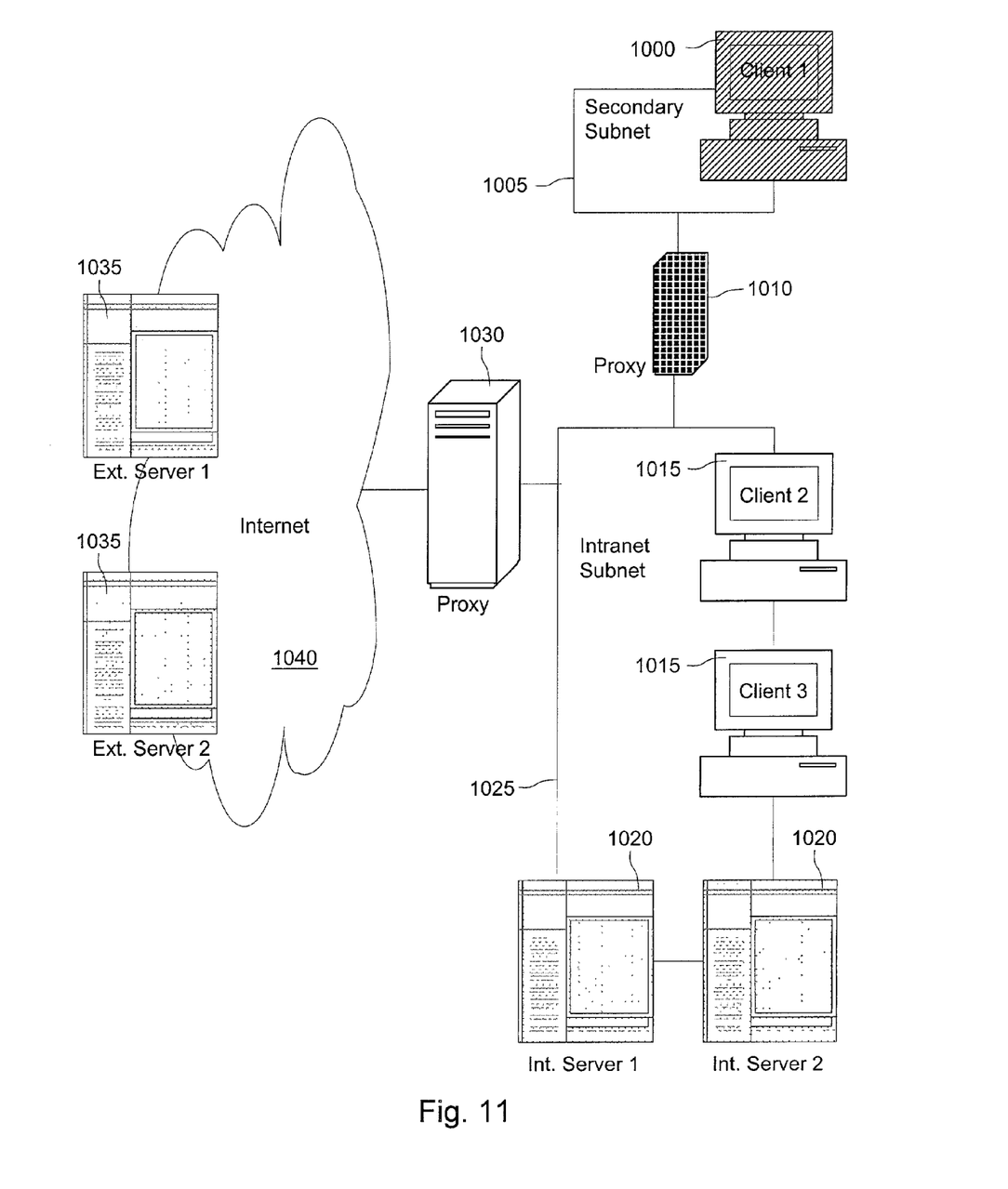

FIG. 11 illustrates the network configuration where a client machine 1000 residing on a secondary subnet 1005 is able to receive extension of web content. Extended proxy 1010 is coupled between secondary subnet 1005 and intranet subnet 1025 thereby extending content provided from internal servers 1020 and external servers 1035 residing on Internet 1040.

It should be appreciated by one of ordinary skill in the art that any combination of the above network configurations may be used, including combining aspects illustrated in each figure, without departing from the scope if the invention. For example, the configuration of providing a proxy between the Internet and a primary intranet subnet illustrated in FIG. 9 may also include a secondary subset configuration as illustrated in FIG. 10.

Although the invention is described with reference to specific embodiments thereof, the embodiments are merely illustrative, and not limiting, of the invention, the scope of which is to be determined solely by the appended claims.

What is claimed is:

1. A computer implemented method for embedding data in a text page at a proxy, the proxy comprising an intermediary between a resource and a request for the resource, the method comprising:

receiving the request for the resource at the proxy from a client machine, wherein the proxy is configured to accept requests from a plurality of client machines, wherein the client machines are independent of the proxy;

extracting, at the proxy, a resource identifier from the request and storing said the resource identifier, wherein the resource identifier identifies the resource being requested;

forwarding the request for said resource from the proxy to a location having the resource;

receiving the resource in response to forwarding the request;

thereafter, at the proxy, parsing the received resource based at least partially on the resource identifier to match the received resource with the previously stored resource identifier;

analyzing a plurality of templates using at least the previously stored resource identifier to obtain a template associated with the resource;

using the template associated with the received resource identified by the previously stored resource identifier to identify one or more recognized elements in the received resource; and embedding data into the received resource based on the one or more recognized elements.

2. The computer implemented method of claim 1 wherein said proxy comprises a firewall.

3. The computer implemented method of claim 1 wherein said proxy comprises an extension to a web server.

4. The computer implemented method of claim 1 wherein said proxy comprises a proxy server.

5. The computer implemented method of claim 1 wherein said proxy comprises a web browser and/or an extension to one.

6. The computer implemented method of claim 1 wherein said proxy comprises an Internet Service Provider (ISP).

7. The computer implemented method of claim 1 wherein said embedded data comprises meta-data.

8. The computer implemented method of claim 1 wherein said embedded data comprises a script.

9. The computer implemented method of claim 1 wherein said embedded data comprises a link.

10. The computer implemented method of claim 1 wherein said request for a resource is an HTTP request for an HTML document.

11. The computer implemented method of claim 1 wherein said resource identifier is a URL.

12. The computer implemented method of claim 1 wherein said request for a resource is a request for a document from a document management database.

13. The computer implemented method of claim 1 further comprising the step of storing detected element data in a log file coupled to said proxy, said detected element data representing at least said one or more recognized elements.

14. The computer implemented method of claim 1 wherein identifying said one or more recognized elements further comprises performing a dictionary search, wherein said dictionary search comprises locating recognized words or phrases in said resource from a database coupled to said proxy.

15. The computer implemented method of claim 1 wherein identifying said one or more recognized elements further comprises performing a pattern search, said pattern search comprising locating known patterns in said resource from a database coupled to said proxy.

16. The computer implemented method of claim 15 wherein said pattern search is a search for links.

17. The computer implemented method of claim 1 wherein identifying said one or more recognized elements further comprises performing a location search, said location search comprising locating text based on the position of said text in said resource.

18. The computer implemented method of claim 1 wherein said storing a resource identifier comprises storing said resource identifier in computer readable memory coupled to said proxy.

19. The computer implemented method of claim 1 further comprising: generating a request for a resource at a client machine; and
receiving said resource having said embedded data at said client machine.

20. The computer implemented method of claim 1 wherein said parsing of said resource is assisted by the template, wherein the template is configured for identifying recognized elements, said template retrieved from a database coupled to said proxy.

21. A computer implemented method for adding meta-data to a hypertext page using a proxy, said proxy comprising an intermediary between a client machine and one or more networks, the method comprising:
intercepting an HTTP request from the client machine at the proxy, the HTTP request comprising a request for a resource, wherein the proxy is configured to accept requests from a plurality of client machines;
extracting, at the proxy, a URL from the HTTP request and storing the URL in computer readable memory, the URL identifying the requested resource;
forwarding the HTTP request to a network having the requested resource; receiving the requested resource at the proxy in the form of an HTTP response; extracting, at the proxy content out of the HTTP response;
matching the received requested resource with the previously stored URL from an HTTP request forwarded in the forwarding step;
analyzing, a plurality of templates using at least the previously stored URL;
locating a template from the plurality of templates that corresponds to the received resource identified by the matching previously stored URL;
embedding meta-data into the content using the template; and sending the content in the HTTP response to the client machine.

22. The computer implemented method of claim 21, wherein said step of embedding meta-data further comprises:
building a document object model (DOW using an HTML text stream from said HTTP response;
adding meta-data into the DOM by creating new DOM elements and attributes; and
serializing the DOM with the added meta-data into the HTML text stream.

23. The computer implemented method of claim 21 further comprising:
generating an HTTP request by a client machine; and
receiving said HTTP response at said client machine.

24. The computer implemented method of claim 21 wherein said resource is an HTML stream.

25. The computer implemented method of claim 21 wherein said network is an intranet network.

26. The computer implemented method of claim 21 wherein said network is the Internet.

27. The computer implemented method of claim 21 wherein said network is a document management system.

28. The computer implemented method of claim 21 wherein said template is obtained from a template database coupled to said proxy, said template is selected based on said URL.

29. The computer implemented method of claim 28 wherein said template database is coupled to a location having up-to-date templates, wherein said template database receives said up-to-date templates from said location through said proxy automatically.

30. The computer implemented method of claim 29 wherein said template database is coupled to a location having said up-to-date templates, and receives said up-to-date templates using the Internet.

31. The computer implemented method of claim 21 wherein said template assists a dictionary search, wherein said dictionary search comprises recognizing elements in said resource by a word or a phrase.

32. The computer implemented method of claim 21 wherein said template assists a link search, wherein said link search comprises recognizing elements in said resource based on the structure of a hyperlink.

33. The computer implemented method of claim 21 wherein said template assists a location search, wherein said location search comprises recognizing elements in said resource based on the location of said element in said resource.

34. A computer implemented method for adding a script to a hypertext page using a proxy, comprising:
intercepting a resource request from a client machine at said proxy, said resource request identifying a resource;
extracting, at the proxy, a resource request identifier from the resource request and storing the resource request identifier in computer readable memory, the resource request identifier associated with the resource;
forwarding the resource request to a network and thereafter locating the resource; returning the resource to the proxy in a response to the forwarded resource request;
matching the received resource with the previously stored resource request identifier from a the resource request;
analyzing a plurality of templates using at least the previously stored resource request identifier to obtain a template associated with the resource;
locating a template from the plurality of templates that corresponds to the received resource identified by the matching previously stored resource request identifier; embedding at least one script into the response using the located template; and sending the response to the client machine.

35. The computer implemented method of claim 34, wherein said step of embedding at least one script further comprises:
building a document object model (DOM) out of an HTML text stream from said response;
adding at least one script into the DOM by creating new DOM nodes, elements or attributes; and
serializing the DOM with the at least one added script back into the HTML text stream.

36. The method of claim 34 wherein said network is the Internet.

37. The method of claim 34 wherein said network is an intranet.

38. The method of claim 34 wherein said network is a document management database.

39. The method of claim 34 wherein said document request identifier is a URL.

40. The method of claim 34 wherein said resource is generated from spreadsheet software, presentation software and/or word processing software.

41. The method of claim 34 further comprising generating a document request for a resource by a client machine.

42. A computer implemented method for providing navigation options at a client machine without any additional computer program physically installed on said machine, said method occurring entirely at points removed from said machine, said method comprising:
receiving a request for a resource at a proxy;
extracting and storing a resource identifier from said request at said proxy;
forwarding said request for said resource from said proxy to a location having said resource;
receiving the resource at the proxy in response to forwarding the request;
thereafter parsing the received resource based on the resource identifier to match the received resource with the previously stored resource identifier,
analyzing a plurality of templates using at least the previously stored resource identifier to obtain a template associated with the resource;
using a template associated with the received resource identified by the previously stored resource identifier to identify one or more recognized elements in the resource;
embedding data into the resource at the proxy based on the one or more recognized elements; and
recognizing the data at the proxy and thereafter providing a navigation option at said client machine based on the data.

43. The computer implemented method of claim 42 wherein said data comprises meta-data and a navigation script, wherein said meta-data and said script in combination provide navigation options.

44. The computer implemented method of claim 42 wherein said navigation option comprises a single click hypertext link.

45. The computer implemented method of claim 42 wherein said navigation option comprises an HRNP link, wherein said HRNP link can be clicked at a first location and dragged to a second location.

46. The computer implemented method of claim 42 wherein said navigation option comprises a pop-up menu having a list of links.

47. The computer implemented method of claim 42 wherein said navigation option comprises a list of icons.

48. A system for adding data to a text page at a proxy, said system comprising:
a proxy having computer readable memory and a database coupled thereto, said proxy having a filter for receiving a request for a resource, extracting and storing a resource identifier from said request, wherein the resource identifier identifies the resource being requested, forwarding said request for said resource from said proxy to a location having said resource, receiving said resource in response to forwarding the request and thereafter parsing said resource based on said resource identifier to match said resource with the previously stored resource identifier, analyzing a plurality of templates using at least said previously stored resource identifier to obtain a template associated with said resource, using said template associated with the received resource identified by the previously stored resource identifier to identify one or more recognized elements in said resource, and embedding data into said resource based on said one or more recognized elements, said proxy being configured to accept requests from a plurality of client machines;
at least one server coupled to said proxy, and
at least one client machine coupled to said proxy and said server.

49. A computer implemented method for embedding data at an intermediary, said intermediary coupled to both a resource and an application, said method comprising:
receiving, at the intermediary, a document generated from the application; retrieving the resource at the intermediary, wherein the resource is identified and selected based on the application;
analyzing a plurality of templates using the application to obtain a matching template associated with the resource;
identifying the matching template that matches the document;
parsing the document using the matching template to identify one or more recognized elements in the document; and
embedding data into the document based on the one or more recognized elements.

50. The computer implemented method of claim 49, wherein said application is a word processing application.

51. The computer implemented method of claim 49, wherein said application is a spreadsheet application.

52. The computer implemented method of claim 49, wherein said search and identify said one or more recognized elements further comprises a dictionary search, wherein said dictionary search comprises locating recognized words or phrases in said resource from a database coupled to said proxy.

53. The computer implemented method of claim 49, wherein said search and identify said one or more recognized elements further comprises a pattern search, said pattern search comprising locating known patterns in said resource from a database coupled to said proxy.

54. The computer implemented method of claim 49, wherein said resource is a template obtained from a template database coupled to said proxy, said template is selected based on said application.

* * * * *